UNITED STATES PATENT OFFICE.

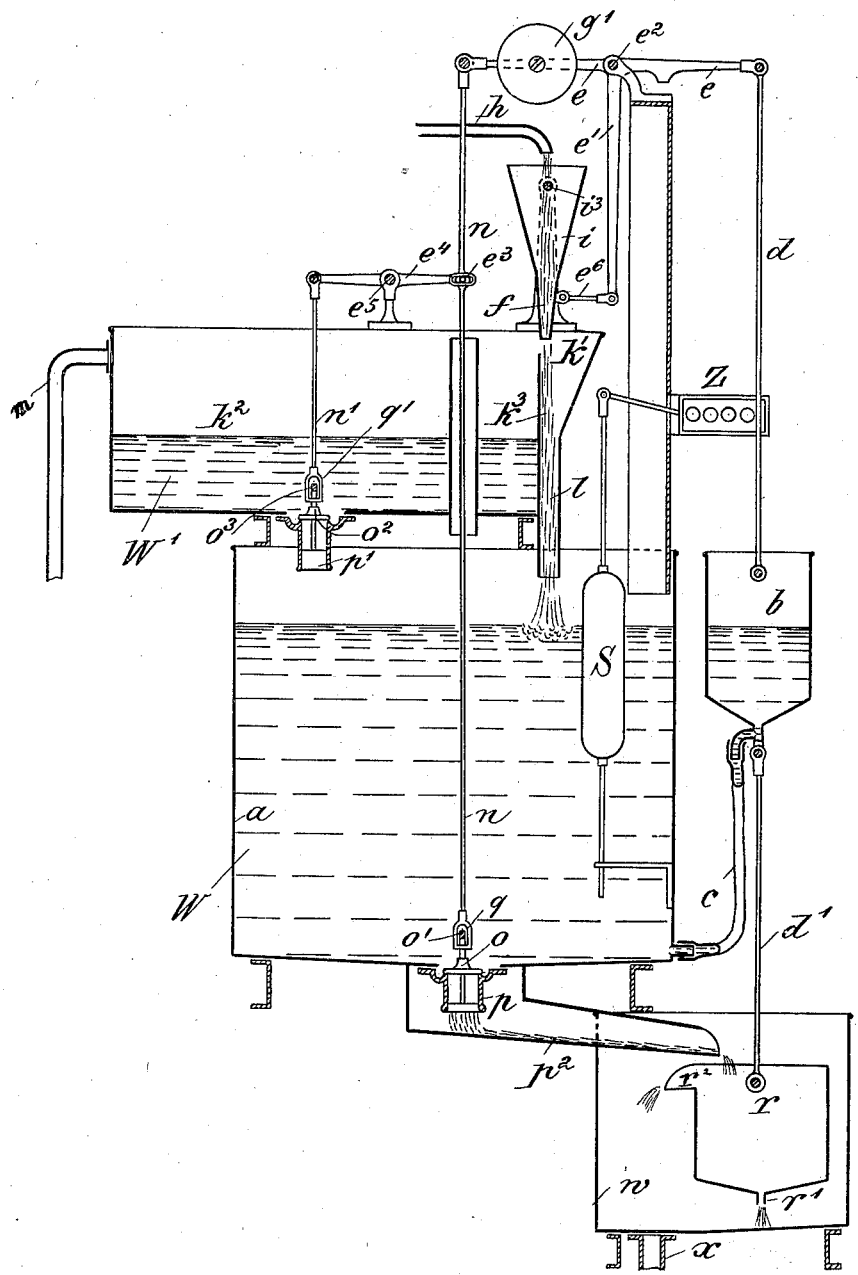

MAX ARNDT, OF AIX-LA-CHAPELLE, GERMANY.

MEASURING APPARATUS FOR LIQUIDS.

SPECIFICATION forming part of Letters Patent No. 653,203, dated July 10, 1900.

Application filed December 10, 1898. Serial No. 698,932. (No model.)

*To all whom it may concern:*

Be it known that I, MAX ARNDT, a subject of the King of Prussia, German Emperor, residing at the city of Aix-la-Chapelle, Germany, have invented a new and useful Measuring Apparatus for Liquids, (for which I filed an application for patents in France on May 14, 1898, and in Germany on May 25, 1898,) of which the following is a specification.

My invention relates to a measuring apparatus for liquids in which the liquid is assembled in a vessel and automatically discharged therefrom whenever a predetermined quantity of liquid has been assembled.

My invention consists of a stationary main assembling vessel for the liquid and of a movable additional vessel communicating with the former and controlling by means of rods and levers the admitting of liquid to and the discharging thereof from the main vessel.

In the accompanying drawing I have represented my invention in a sectional view.

Letter $a$ designates the stationary main assembling vessel, and $b$ the movable additional vessel communicating with the former by a hose $c$ and connected by a rod $d$ to a lever $e$, which is pivoted at $e^2$ and provided with a controlling-weight $g'$ and a downwardly-projecting arm $e'$. To the latter is connected by a link $e^6$ a rocking funnel $i$, pivoting on $i^3$, so as to alternately present its discharging end $f$ to either of sections $K'$ and $K^2$, formed by a partition $K^3$ of a reservoir $W'$. The left-hand arm of lever $e$ carries a rod $n$, passing through a guide-tube, which is fixed to the bottom of reservoir $W'$ and loosely connected at its lower end to a valve $o$ on a valve-seat $p$, the valve-stem being provided with a head $o'$, engaging with a slotted end piece $q$ of rod $n$. Rod $n$ is loosely connected to a lever $e^4$, pivoting on $e^5$, and to the left-hand end of the lever a rod $n'$ is suspended, carrying loosely a valve $o^2$ on valve-seat $p'$, the loose connection being brought about by the head $o^3$ of the valve-stem engaging with the slotted end piece $q'$ of rod $u'$. Reservoir $W'$ is provided with an overflow-pipe $m$ and section $K'$ of the reservoir with a downwardly-projecting channel $l$.

To vessel $b$ is suspended by a rod $d'$ a vessel $r$, the latter being provided at its bottom with a narrow discharging-slot $r'$ and with an overflow-gutter at its upper end. A channel $p^2$ is fixed to the outside of the bottom of the main assembling vessel $a$ and reaches with its discharging end above vessel $r$. The latter is contained within a casing $w$ and a discharging-pipe $x$, provided to the bottom of casing $w$.

The operation is as follows: The several parts assuming the positions indicated in the drawing the liquid continuously flows through a pipe $h$, then passing through funnel $i$ and section $K'$ of the reservoir $W'$, and discharging through channel $l$ into the main assembling vessel $a$. As the latter communicates with vessel $b$, the level of the liquid in vessel $b$ will always be flush with the liquid-level in vessel $a$, and as soon as a sufficient quantity of liquid has entered vessel $b$ to overcome weight $g'$—that is to say, if the liquid in vessels $a$ and $b$ has reached the predetermined quantity to be measured by the apparatus—vessel $b$ will descend by gravity, shifting funnel $i$ so as to present its discharging end $f$ to section $K^2$ and at the same time closing valve $o^2$ but opening valve $o$. From thence the stream of liquid is led into reservoir $W'$, and no further liquid will therefore enter main vessel $a$, while the liquid contained in the latter is discharged through pipe $p$ and led into vessel $r$. As soon as the latter is filled up the liquid overflowing through gutter $r^2$ into casing $w$ is continuously discharged through pipe $x$, and this takes place until vessels $a$ $b$ and hose $c$ are emptied. From thence the remainder of liquid contained in vessel $r$ will be discharged through narrow slot $r'$. This being the case, the liquid contained in vessel $r$ forms an additional weight to that of the liquid contained in vessel $b$ as long as there is any liquid contained and will replace that liquid when vessel $b$ has been emptied, and no action can be exerted by weight $g'$ to restore lever $e$ to its initial position until vessels $a$ $b$ and hose $c$ are emptied. The remainder of liquid contained in vessel $r$ being discharged therefrom through slot $r'$, its weight successively decreases, so as to finally be overcome by weight $g'$ restoring lever $e$ to its initial position, with the result of shifting funnel $i$ above section $K^2$, opening valve $o^2$ and closing valve $o$. The liquid assembled before in reservoir W' will therefore be discharged into main assembling vessel $a$ and likewise the stream of the flowing liquid led into the same until the predetermined quantity has been assembled therein again, and so on.

A float-gage S is provided in the main assembling vessel and connected by a rod to a counting device Z of any well-known construction. By these means each filling of vessel $a$ may be automatically registered on the counting device.

What I claim as my invention, and desire to secure by Letters Patent, is—

1. In an automatic measuring apparatus for liquids the combination of a stationary main assembling vessel, an additional movable vessel communicating therewith, a lever actuated by the additional vessel, a discharging-valve for the main assembling vessel controlled by the lever, an admitting-channel placed above the main assembling vessel, and a rocking funnel controlled by the said lever to be temporarily presented to the admitting-channel.

2. In an automatic measuring apparatus for liquids, the combination of a stationary main assembling vessel, an additional movable vessel communicating therewith, a lever actuated by the additional vessel, a discharging-valve for the main assembling vessel controlled by the lever, an admitting-channel placed above the main assembling vessel, a rocking funnel controlled by the said lever to be temporarily presented to the admitting-channel, and a supplemental vessel connected to the additional vessel and placed beneath the discharging-opening of the main assembling vessel.

In testimony that I claim the foregoing as my invention I have signed my name in presence of two subscribing witnesses.

MAX ARNDT.

Witnesses:
FRANK M. BRUNDAGE,
CLARA E. BRUNDAGE.